United States Patent
Voyer

(10) Patent No.: US 6,714,788 B2
(45) Date of Patent: Mar. 30, 2004

(54) METHOD OF REDUCING BASE STATION OVERLOADING

(75) Inventor: Nicolas Voyer, Rennes (FR)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 128 days.

(21) Appl. No.: 09/745,473

(22) Filed: Dec. 26, 2000

(65) Prior Publication Data

US 2002/0198000 A1 Dec. 26, 2002

(30) Foreign Application Priority Data

Dec. 31, 1999 (EP) .......................................... 99403327

(51) Int. Cl.$^7$ .................................................. H04Q 7/20
(52) U.S. Cl. ...................... 455/453; 455/436; 455/442; 455/452.2; 370/335; 370/441; 370/331
(58) Field of Search ................................ 455/436–442, 455/525, 452, 453, 452.2; 370/335, 441, 331

(56) References Cited

U.S. PATENT DOCUMENTS

| | | | |
|---|---|---|---|
| 5,542,097 A | 7/1996 | Ward et al. | |
| 5,594,943 A | 1/1997 | Balachandran | |
| 5,666,356 A | 9/1997 | Fleming et al. | 370/328 |
| 5,781,861 A | 7/1998 | Kang et al. | |
| 6,002,676 A | 12/1999 | Fleming | |
| 6,011,970 A | 1/2000 | McCarthy | |
| 6,018,663 A | 1/2000 | Karlsson et al. | |
| 6,038,448 A | 3/2000 | Chheda et al. | |
| 6,078,817 A * | 6/2000 | Rahman | 455/452 |
| 6,128,500 A * | 10/2000 | Raghavan et al. | 455/453 |
| 6,141,335 A | 10/2000 | Kuwahara et al. | |
| 6,163,698 A | 12/2000 | Leitch et al. | |
| 6,167,282 A | 12/2000 | Hunsberger | |
| 6,181,946 B1 | 1/2001 | Gettleman et al. | |
| 6,185,423 B1 | 2/2001 | Brown et al. | |
| 6,195,342 B1 * | 2/2001 | Rohani | 144/134.1 |
| 6,278,875 B1 | 8/2001 | Sun | |
| 6,301,481 B1 | 10/2001 | Parra | |
| 6,307,849 B1 | 10/2001 | Tiedemann, Jr. | |
| 6,321,089 B1 * | 11/2001 | Han | 455/442 |
| 6,324,401 B1 * | 11/2001 | De Hoz Garcia-Bellido et al. | 455/442 |
| 6,330,449 B1 * | 12/2001 | Kim | 455/442 |
| 6,353,602 B1 | 3/2002 | Cheng et al. | |
| 6,360,098 B1 * | 3/2002 | Ganesh et al. | 455/436 |
| 6,430,414 B1 * | 8/2002 | Sorokine et al. | 455/442 |
| 2001/0041572 A1 | 11/2001 | Lundqvist et al. | |

FOREIGN PATENT DOCUMENTS

| | | |
|---|---|---|
| JP | 4-304058 | 10/1992 |
| WO | WO 98/48530 | 10/1998 |
| WO | 99/05873 | 2/1999 |
| WO | WO 99/60797 | 11/1999 |

OTHER PUBLICATIONS

Patentability Search for "Method of Reducing Base Station Overloading" U.S. patent application Ser. No. 09/745,473.
3GPP TS 25.433 V3.8.0 (2001–12)., 3rd Generation Partnership Project; Technical Specification Group Radio Access Network; UTRAN lub interface NBAP signalling (Release 1999) (4 pages).

* cited by examiner

*Primary Examiner*—Dwayne Bost
*Assistant Examiner*—Sujatha Sharma
(74) *Attorney, Agent, or Firm*—Oblon, Spivak, McClelland, Maier & Neustadt, P.C.

(57) ABSTRACT

A method of reducing base station overloading consists of a series of sequential steps, beginning with reducing the decibel size of the handover window, base station exclusion, only one base station being excluded at a time, mobiles not in soft handover not being excluded, and if more than one base station in the active set is overloaded, excluding the station which has the strongest received power from the active set.

7 Claims, 1 Drawing Sheet

METHOD OF REDUCING BASE STATION OVERLOADING

BACKGROUND OF THE INVENTION

1. Field of the Invention

The present invention relates to a link exclusion method for use during a soft handover in a cellular system of mobile radio communication.

2. Discussion of the Background:

In mobile radio communication, one type of which is commonly referred to as a cell phone system, mobile users communicate with a fixed network by using base stations as a relay. Each base station may communicate with any mobile user that is within its radio coverage area, which is often called a radio "cell". When a mobile unit moves from one cell to the other, it then changes covering area and is no longer able to communicate with the base station covering its former cell.

A classical solution for not interrupting communication while a mobile changes from one cell to another cell is called "handover". It consists in allowing a mobile that has begun communication with the network via a first base station to be connected to a second base station that will then serve to relay the communication to the network. This type of relay transfer is determined by the network based on many criteria. Most often, the criteria consist of passing on the relay from one base station, from which mobile is moving away, to a base station which it is approaching, But other criteria exist, as for example, when a cell becomes overloaded, the network may force a handover to a less overloaded cell.

It is to be noted that during handover, synchronization problems may be encountered between both links when the time comes to transfer to a new base station, which may cause undesirable effects on the communication between the mobile and the network.

When the communication between the network and the mobile is not affected from the users point of view, the handover is referred to as a seamless handover. A type of seamless handover is often used by duplicating the communication between the, mobile and second base station. Once the communication is established and the synchronization problems are resolved, the mobile is then in communication with both base stations (this is possible in overlap zones between cells), for a short moment and then the communication with the first base station is ended. This is referred to as a "hard" handover.

The procedure for establishing a hard handover may take a while and during that period of time, it is possible that the criterion which leads to a handover may change, and that a new reverse handover may occur. If the handover repeatedly occurs between two base stations a "ping-pong" phenomenon that may last which is harmful to the quality of the link, the link not being completely established with the most appropriate base station. In other respects, this type of handover procedure requires signaling between base stations, which should be limited in order to maintain useful information within the network. In order to limit the "ping-pong" effect, we may use a hysteresis, or time delay, when deciding to go ahead with a handover. But the hysteresis will then involve a delay in the decision to complete the handover which may again be harmful to the quality of the link.

Another version of handover exists which consist in preserving the former link for a certain period of time, according to a certain criterion. During that period of time, the communication is indeed reinforced by a phenomenon called macro-diversity: if one of the links suddenly weakens, for example when a mobile enters into a shade zone (corner of a building, bridge, etc.), the other link may not be affected and avoid a degradation of the communication. This type of handover is called "soft" handover, and brings a considerable profit in terms of quality of transmission in comparison to a hard handover.

A classical way of performing a soft handover consists in comparing the power level received from different base stations neighboring the mobile station. It is then decided that the mobile station be in soft handover with all the base stations so that their power level received by the mobile be in the range between the maximum power level received and that power reduced by a factor which is determined in advance. This factor may be expressed in decibels, and that is what represents the handover window. The group of base stations with which the mobile is in communication represents what is called the "Active Set" of the mobile. With other respects, since the mobile cannot support an infinite number of links, the size of the active set is limited. In this way, the impact of the soft handover is modulated by working with two parameters: the size of the active set and the handover window.

The same type of ping-pong phenomenon occurs in soft handover as well as in hard handover. However, the impact on the quality of the link is much lower since the windowing system of the soft handover is in itself a form of hysteresis. The ping-pong would eventually be located at the input/output of the handover, but the impact would remain weak, since the strongest link would always be preserved. However, in order to avoid this ping-pong effect on the input/output of a Base Telephone Station (BTS) in an active set, we may add an output criterion to the active set that may be looser, and therefore add a second hysteresis. The interest of such sophistication would then rest less in the concern of preserving the quality of the link (which from observation is by nature preserved by the actual principle of the soft handover), than the concern of reducing the signaling load in the network following a too large request for addition or withdrawal of BTS within the same active set.

In the soft handover situation, the communication is then optimized by the combination of signals coming from many different links. This combination may be done in many ways. For example, each of the links may be demodulated and decoded in an individual and, regular manner, and at each moment, the best of them is selected to effectively participate in the communication. We then refer to the "selection combining". This technique can be compared to an instant hard handover without having to previously negotiate, since the communication is available on all the links in the active set.

An important variant of this combination technique consists of a joint demodulation of the different links. Each link then contributes to the quality of the communication in proportion to the power received. This latter technique, based on the "Maximum Ratio Combining" allows taking better advantage of the gain in diversity induced by the soft handover, and is the technique status known under the name of "softer" handover. To be effective, this technique requires that the recombination be done before the error corrector decoding, which is not always the case in the network up link.

It is to be noted that even if it is interesting from a radio communication quality point of view, soft handover is not used in all mobile radio systems. In fact, it requires a duplication of radio resources that can increase the complexity and the mobile station's ability to receive two signals coming from more than two different stations, on frequencies that are not necessarily the same. This is why in GSM (Group Speciale Mobile) for example only the seamless hard handover is useful. For other mobile radio systems, for example based on code division multiple access (CDMA), it is however possible to recover the two links from only one receiver. This is due to the fact that two adjacent cells may use the same frequency without causing one another too much harm in terms of interference, thanks to the nature of the spread spectrum signals that are used.

In such CDMA systems, limited in terms of capacity from the total level of interference, soft handover brings additional advantages. In fact, the number of links in the system becomes larger than the number of users in the system due to the soft handover, and with the same useful load, the effective load of the network becomes larger than in the case of the hard handover. This has an impact on the system capacity that, we are seeking to optimize.

In other respects, we must differentiate the up link (mobile towards the network) from the down link (network towards mobile). In the case of the down link, the base stations in the Active Set must transmit a radio signal with a similar power, and interference is caused to the rest of the system cells, which tends to deteriorate the radio performance of the system. Also, the total power radiated by each base station is inclined to increase, and the base stations may be getting closer to the saturation point and to their limit capacity.

However, in the up link, the signal transmitted by the mobile station may be captured by many base stations without any changes, from a power point of view, transmitted by the mobile. On the contrary, when the soft handover is possible, the gain in performance is such that the power transmitted by the mobile becomes weaker than if we would have used a hard handover. The soft handover provides improvements in the up link.

An improved version of the soft handover exists, which consists of transmitting to the down link only the link which we believe will be the best. The communication is therefore duplicated from the network towards the base stations, but a mechanism is required to decide in a regular manner which is the link that is evaluated to be the best, before transmission between the base stations and the mobile. This system preserves the advantages of the soft handover in the up link (that is not changed), but mostly avoids any waste of the radio resources (which means to put more power) in the down link. This system is known under the name "Site Selection Diversity Transmission" (SSDT) and is kept as an option of the UMTS (Universal Mobile Telecommunication System) system.

The SSDT system is not completely satisfactory. In fact, since it is based on a link selection, it no longer implements the advantageous version of the "softer" handover that brings the best of gain that we ran expect in the down link. In other respects, the link selection is made on an evaluation of the best link in the past. Therefore, this estimation can be distorted during its construction, it can be badly transmitted toward the network if it is done by the mobile, and mostly, it may not be up-to-date at the moment of transmission. And so, the selected link has a strong chance of not being the right one, which again deteriorates the performances of the soft handover. Finally, it is to be noted that if the communication is not duplicated in the radio field, it still is duplicated in the network. This means that some resources in the network are used to carry information that will not be used. It is in some way a waste of network resource. In the end, it is not satisfactory for an owner of a mobile radio network to delegate to his clients the responsibility of handling his radio resource.

In brief, we realize at this point in time that there is no system which is completely satisfactory.

SUMMARY OF THE INVENTION

The present invention consists of a group of criteria to activate or disable the soft handover that will optimize the impact of the soft handover on the system capacity. With the traditional methods described above, the system capacity is limited by the number of mobiles in soft handover. An average of 37% of the mobiles are in soft handover for a windowing size of 6 decibels. Thus in an aspect of the present invention the size of the handover window is reduced from 6 to 3 decibels. For a window of 3 decibels, the number of mobile units in soft handover goes down to 22%. We then see that we could gain up to 37/137=27% in capacity in the network if we would use a more appropriate handover window.

In accordance with another aspect of the present invention the method disclosed herein provides in the overloaded cells, a means to reduce the number of mobiles in soft handover.

BRIEF DESCRIPTION OF THE DRAWINGS

A more complete appreciation of the present invention and many of the attendant advantages thereof will be readily obtained as the same becomes better understood by reference to the following detailed descriptions and accompanying drawings.

DETAILED DESCRIPTION OF THE INVENTION

Figure 1:
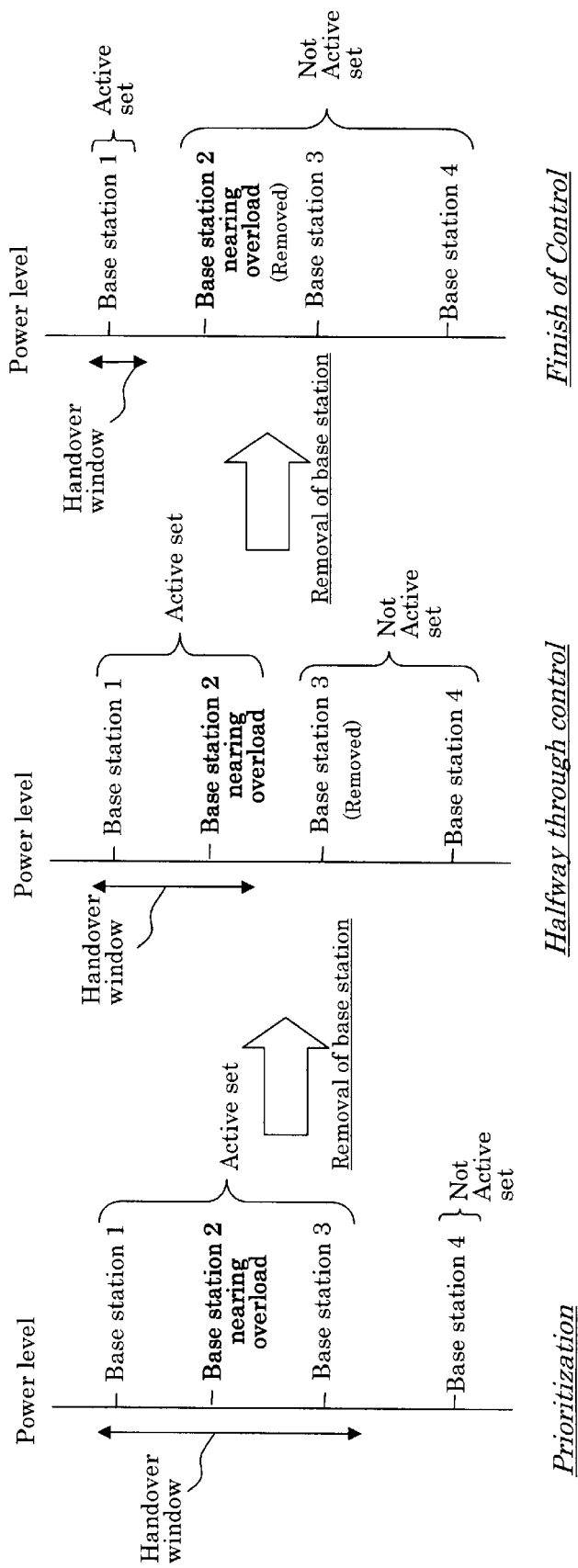
FIG. 1 is a flow diagram of an embodiment of the present invention.

First, the handover window used for each mobile depends on the load of the strongest base stations. Therefore, to exclude a base station which is close to the saturation point from the active set of base stations supporting a mobile in soft handover, the handover window must be set to a lower ratio of power received by the mobile from the strongest base station and the power received by the mobile from the station close to saturation. This would have an effect to also exclude from the active set the station with links a little weaker, but that would have been useful in helping to maintain the communication where deterioration was anticipated to happen if the size of the active set was reduced. Taken alone, this is not a preferred mode of operation.

Second, it might sometimes be more effective to always use the same handover window, but to introduce an exclusion mechanism from the active set, of the cells likely to rapidly reach a saturation level. That is, in case of a BTS reaching its saturation point in power, to drop the links that are deemed undesirable for the concerned BTS, but not for the corresponding calls.

This appears to be a known mechanism in mobile radio systems, known under the name of "call dropping". In the case of a call dropping, the system may allow itself, in limited cases of non-stability, to abruptly end a call. This phenomenon of dropping is essential in the CDMA systems, because it is a matter of particularly unstable systems under strong network load. However, it must be known that the dropping is badly perceived by the network users. It corresponds to an abrupt cut of the communication, that is unpredictable by the user.

A possible solution is simultaneously dropping calls to attempt to stabilize the network, and a criterion decision of input/output of the base station in the active set of each user. Unlike dropping, this does not abruptly end a communication when one of the base stations becomes overloaded. It just maintains the links on the other base stations, reducing the transmission power of the overloaded base station.

Based on base station loading, a determination is made to exclude a BTS from the active set of a mobile in soft handover with the base station nearing an overload condition. Base stations supporting a mobile not in soft handover (in which the size of the active set is equal to one) must not be excluded the active set of the mobile not in soft handover. The BTS that can be excluded from a given mobile's active set is excluded based on link reliability. It is not necessary to exclude a base station from a given mobile's active set when the number of links in the BTS is below a predetermined value. It is not necessary to exclude the links when the transmission power of the BTS is below a predetermined value. Only one BTS may be excluded at a time from any given mobile's active set. We cannot completely remove all BTS from a given mobile's active set (this would be possible but would rather have to be administrated by another algorithm). When two BTS are overloaded and a mobile is in soft handover with its two BTS, we may choose to exclude the one in which the power received is the strongest. When a BTS is excluded from the active set, it enters the Candidate Set. If subsequently this BTS becomes less overloaded and it again enters in the handover window, it will be able to be added to an active set of a mobile requiring soft handover.

FIG. 1 is a flow diagram of an embodiment of the present invention.

It is to be noted that the process of link exclusion of the BTS may be delicately cut, with the blocking process, which operates in a similar manner, since it consists of excluding from the system the users deemed undesirable. Blocking consists in refusing a call to the network as soon as the call originates. This type of mechanism happens in a system of radio communication, when for example the network becomes overloaded or when it cannot satisfy a high level of demand. Blocking is deemed less abrupt than dropping by the user, even if it is always unpleasant to be unable to contact the person we want to reach.

Contrary to blocking, the process of link exclusion in the active set of a user is transparent for the user. The services continues to go through on less overloaded cells.

It is therefore to be noted that in case of saturation of the system, it is judicious to firstly proceed with a mechanism of link exclusion in the active sets (as described above), before blocking calls, or dropping the excess calls.

The above process to reduce the average number of mobiles in soft handover does not exclude other methods, such as the control of the maximum number of links in the active set, or the control of the handover windowing value.

What is claimed is:

1. A method of reducing base station overloading, comprising:

prioritizing each base station in an active set of base stations in soft handover with a mobile, said active set including a base station nearing overload; and removing a base station from said active set by reducing a handover window size for said mobile, said removing step comprising reducing said handover window size based on a ratio of powers corresponding to a link between said mobile and said mobile's strongest base station and a link between said mobile and said base station nearing overload, controlling said reducing step so as to remove only one base station at a time until said base station nearing overload is removed from said active set.

2. The method of claim 1, said removing step further comprising:

removing from said active set at least one of a base station operating at a transmission power above a predetermined power level and a base station supporting a number of links above a predetermined link level; and retaining in said active set a base station supporting a mobile not in soft handover.

3. The method of claims 1 or 2, said removing step comprising:

retaining at least one base station in said active set.

4. The method of claims 1 or 2, said removing step comprising:

removing from said active set one of at least two overloaded base stations, said one of at least two overloaded base stations having a strongest received power of the at least two overloaded base stations.

5. The method of claims 1 or 2, further comprising:

adding a removed base station to said active set once said removed base station is no longer overloaded.

6. The method to claims 1 or 2, said removing step comprising:

retaining in said active set a base station supporting a number of links below a predetermined link threshold.

7. The method of claims 1 or 2, said removing step comprising:

retaining in said active set a base station operating at a total transmission power below a predetermined total transmission power threshold.

* * * * *